United States Patent [19]

Kumm

[11] 3,757,594
[45] Sept. 11, 1973

[54] VARIABLE SPEED BELT TRANSMISSION
[75] Inventor: Emerson L. Kumm, Tempe, Ariz.
[73] Assignee: The Garrett Corporation, Los Angeles, Calif.
[22] Filed: Feb. 7, 1972
[21] Appl. No.: 223,888

[52] U.S. Cl..................... 74/230.17 F, 74/230.17 A
[51] Int. Cl............................................. F16h 55/52
[58] Field of Search............ 74/230.17 F, 230.17 R, 74/230.17 A

[56] References Cited
UNITED STATES PATENTS
3,115,049 12/1963 Moan ........................... 74/230.17 F
3,395,586 8/1968 Kirchner....................... 74/230.17 F
3,157,066 11/1964 Donley......................... 74/230.17 F Primary Examiner—Charles J. Myhre
Assistant Examiner—R. H. Lazarus
Attorney—Albert J. Miller and Jack D. Puffer

[57] ABSTRACT

The subject transmission has a casing with spaced pulley elements composed of sets or pairs of cone-faced disk sections. The sections of each pair are in opposed relation and supported for simultaneous rotation about axes disposed in predetermined angular relation. One pair of disk sections is adapted to be power driven, a Vee belt having a predetermined compressibility with spaced lobes on the inner sides being trained around the sets of pulleys and transmitting rotary movement from the power driven set, hereinafter designated "the driving set," to the other driven set. One disk section of each pair is axially movable toward and away from the other disk section to change the effective diameters of the pulleys and vary the speed ratio between the driving and driven pulleys. Through use of the angular rotational axes arrangement high friction materials, such as polyurethane on brass, may be used which permits a reduction in the belt frictional surface area, for a specific belt tension, and consequently the use of smaller pulleys.

19 Claims, 8 Drawing Figures

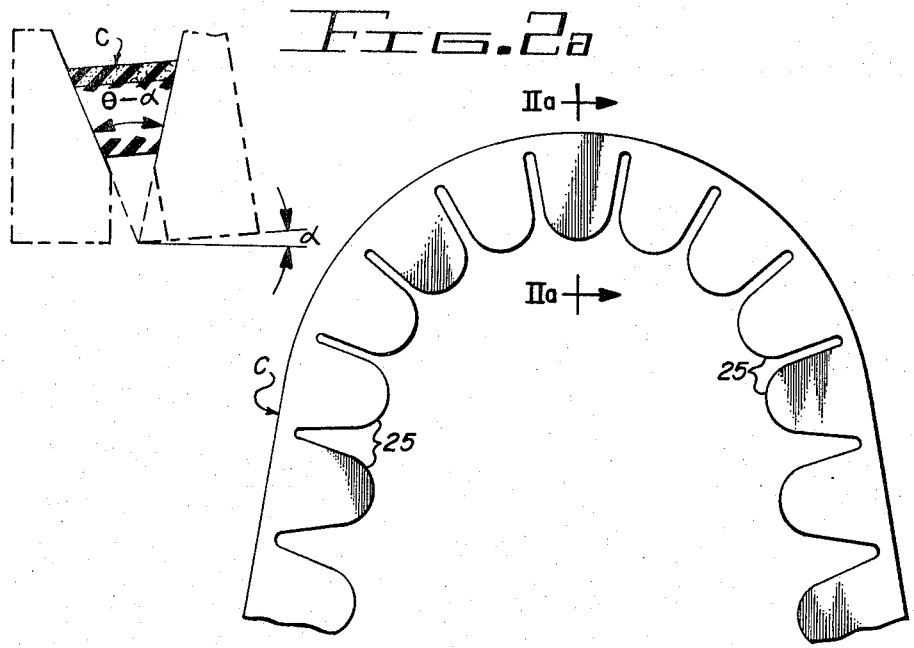
Fig. 2a
Fig. 2
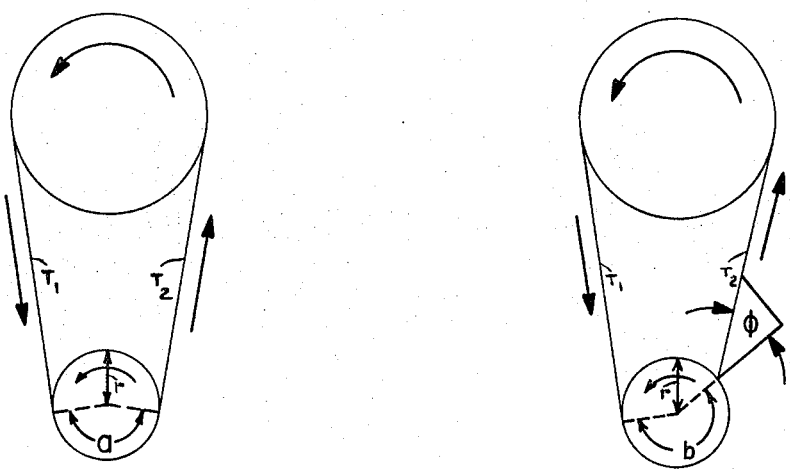
Fig. 3a
Fig. 3b

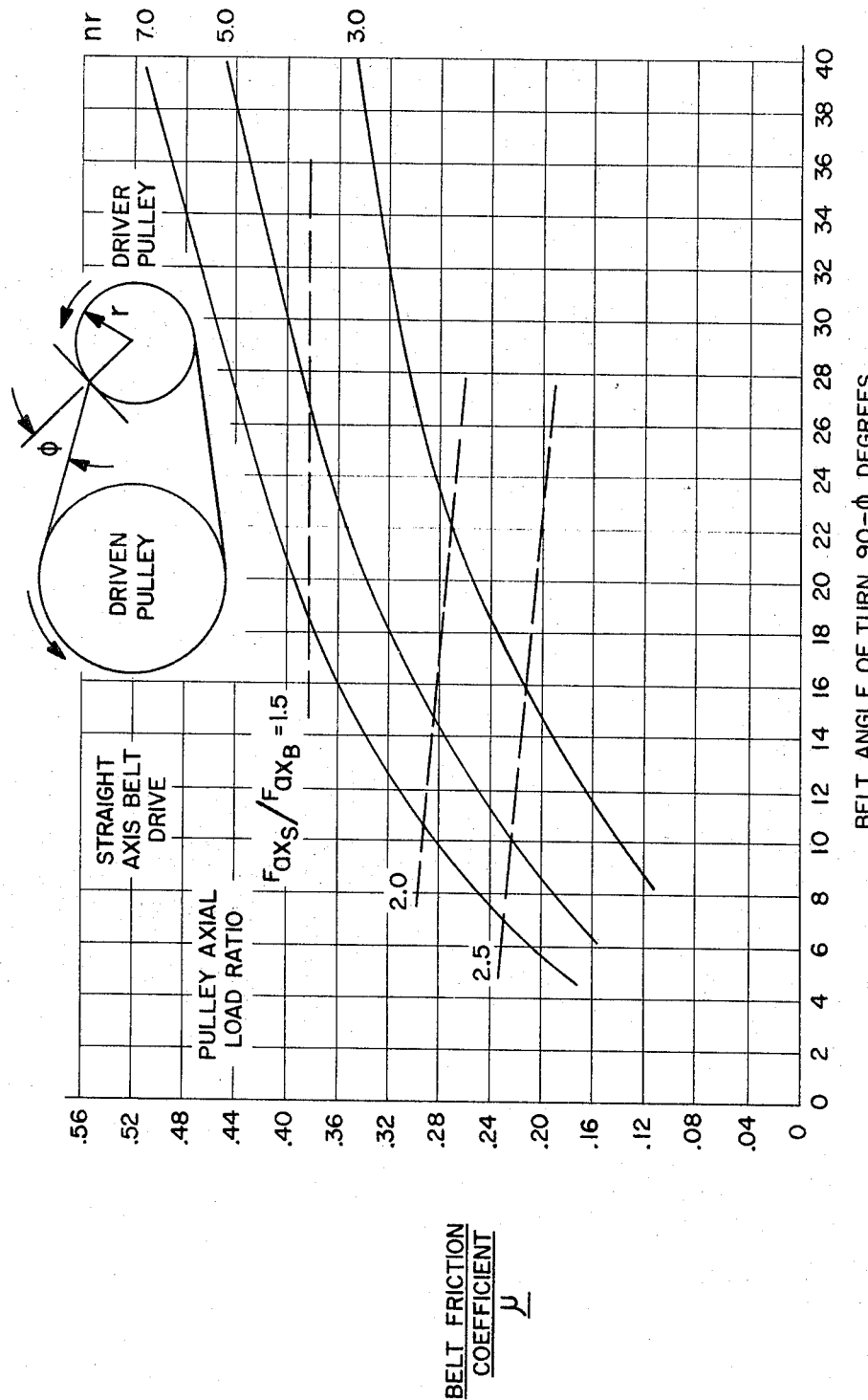

OPERATING CONDITIONS:
P=100 hp
r=1.5 INCHES
θ=1.0 RADIAN

VARIABLE SPEED BELT TRANSMISSION

BACKGROUND OF THE INVENTION

This invention relates generally to belt transmissions of the type exemplified by the U.S. Pat. Nos. 2,827,795 to Caballeros M; 3,043,152 to Karig et al.; 3,157,066 to Donley et al.; 3,137,178 to Bruet; and Italian Pat. No. 364,693 dated Nov. 11, 1938. These transmissions have spaced pulleys, with opposed disk sections having conical friction faces, and an endless drive belt of round or Vee-shaped cross section, the friction faces being adjustable toward and away from one another to vary the effective diameter of the pulleys and the speed ratio of the transmission.

SUMMARY

The present invention is directed to the feature of arranging the opposed disk sections of each pulley of such a transmission for rotation about angularly related axes to reduce the frictional surface area engaged by the belt for a specific belt tension, thus providing for a smooth engagement and disengagement of the belt and pulleys.

The invention is also directed to the feature of arranging one disk section of each pulley for adjustment along the axis of rotation thereof so that the effective diameters of the pulleys can be changed to vary the speed ratio of the transmission. In addition, fluid pressure responsive means are provided to impart movement to the adjustable disk sections, the angular relation of the axes of rotation of the disk sections also serving to reduce the pressure required to urge the disk sections together to secure the minimum squeeze of the belt necessary to effect satisfactory operation.

A further feature of the invention is to construct the adjustable disk section with a cylindrical chamber portion for the movable reception of a piston disposed in fixed relation on the axis of rotation of the disk section. The introduction into and release from the chamber of fluid pressure effects the movement of the adjustable disk section relative to the other or axially fixed disk section in the operation of changing the effective diameter of the pulley. Valve means are provided to simultaneously supply fluid under pressure to the chamber of one pulley and release fluid from the other to change the speed ratio of the transmission.

Other features and/or objects of the invention will be made apparent by the following detailed description of the form of the invention selected for illusration in the accompanying drawings.

IN THE DRAWINGS

FIG. 2 is a side elevational schematic view of a portion of a belt of the type used with the transmission;

FIG. 2a is a sectional view of the belt on the line IIa—IIa of FIG. 2, showing the cone angles of the frictional pulley surfaces engaging the same;

FIGS. 3a and 3b are schematic views to show a comparison between the transmission of the present invention and one constructed according to the prior art;

FIG. 5 is a graphic illustration of forces required in the operation of the transmission of the present invention compared to a prior art transmission.

Figure 1:
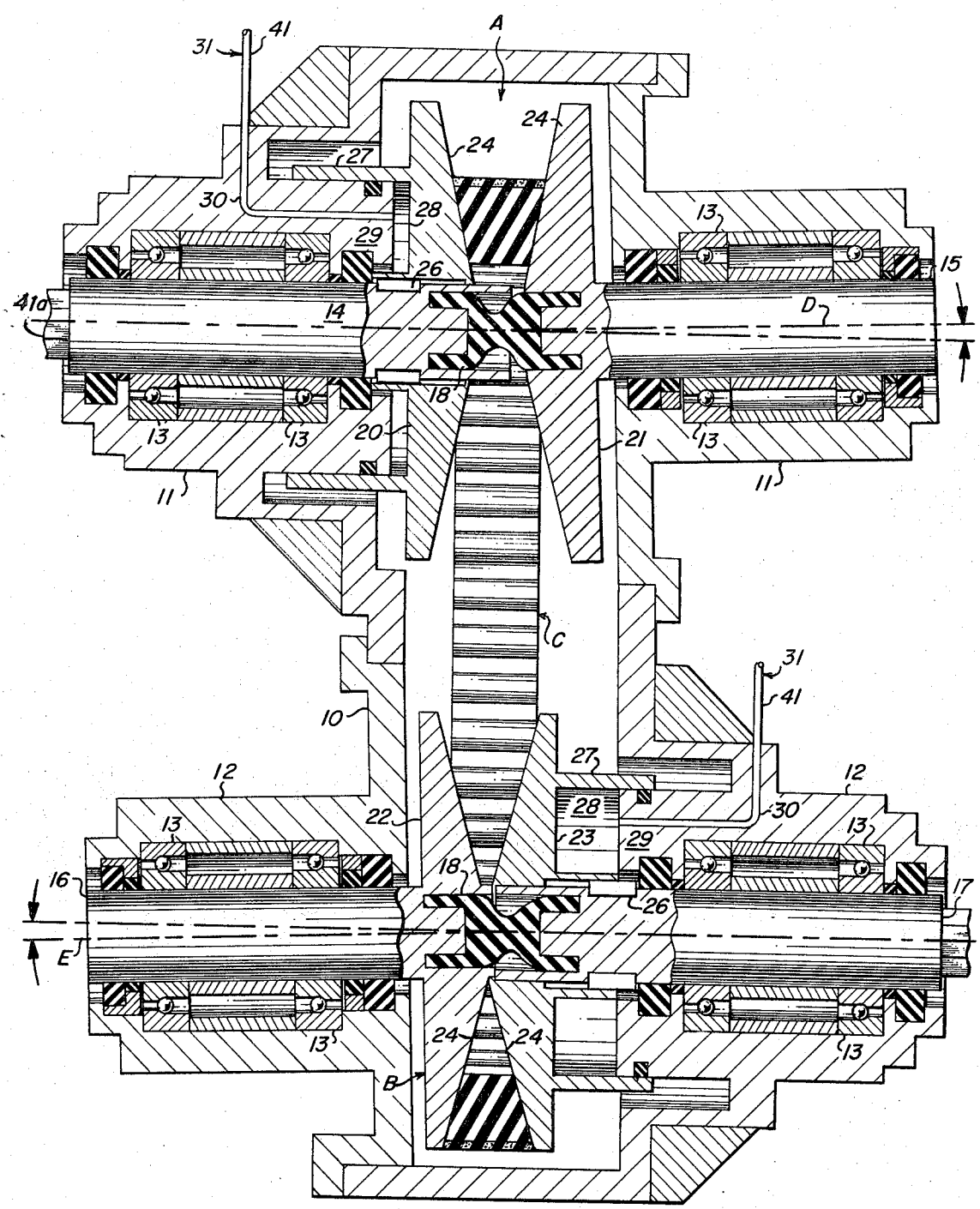
FIG. 1 is an axial sectional view taken through a variable speed belt transmission embodying the features of the present invention.

As shown in the drawings, the transmission includes driving and driven pulleys A and B and an endless belt C trained around the pulleys to transmit rotary movement from one to the other.

More particular reference to FIG. 1 will show that the transmission selected for illustration includes a casing 10 composed of suitable material and constructed to provide spaced pairs of bosses 11 and 12. These bosses are bored to receive antifriction bearings 13 for the rotatable reception of shaft portions 14,15,16,17, which are arranged in pairs. As indicated by broken lines D and E in FIG. 1, the bores in certain of the bosses are disposed at an angle to the bores in the complemental bosses so that the bearings received thereby will place the axes of the shaft portions journalled therein at predetermined angles to the complemental shaft portions. The shaft portions of each pair are coupled to one another by flexible or universal couplings 18 for unitary rotation.

Each shaft portion is provided adjacent the flexible coupling with a disk section 20 to 23 having a conical friction face 24, the faces on adjacent disk sections being opposed and forming Vee-shaped pulley grooves to receive the Vee-shaped endless belt C. It is intended in the present instance to use a belt composed of a compressible material, such as rubber, having spaced lobes 25 on the inner surface. Such belt construction helps to minimize the area of contact of the belt with the friction faces of the pulley and improves the flexibility of the belt.

The disk section of one shaft portion of each pair is formed separately from such shaft portion and is splined thereto as at 26 for rotation with the shaft portion but movable axially thereof. Such movement varies the spacing between the conical friction faces and consequently the effective diameter of the pulley formed by the disk sections. it also provides for the compression of the belt necessary to exert the friction required to transmit the load. In FIG. 1, the movable disk sections are designated by the numerals 20 and 23. It should be noted that such disk sections are arranged, in the present case, on opposite sides of the transmission. While such an arrangement may be desirable, it is not absolutely essential.

To effect the adjustment of the movable disk sections 20 and 23, each is formed with a hub 27 in which a cylindrical chamber 28 is provided for the slidable reception of a piston extension 29 on the adjacent casing wall. It will be noted that the piston extensions are fixed axially with respect to the shaft portion on which the movable disk is mounted. Suitable seal means between the disk sections, the piston extensions and the shaft portions are provided to limit fluid leakage from the chambers 28. The casing 10 is formed with passages 30 through which the chambers 28 communicate with a fluid system 31 employed in adjusting the movable sections.

Figure 4:
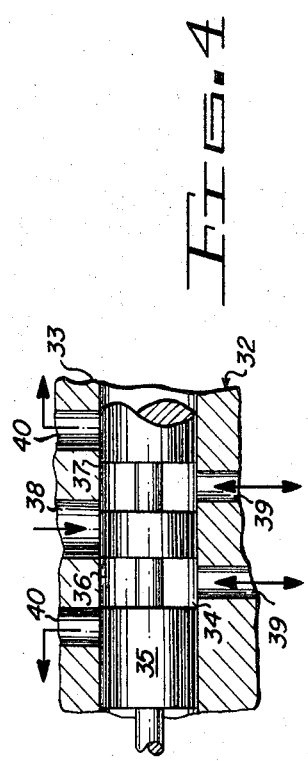
FIG. 4 is a schematic of a valve used to control the application of fluid pressure to and release from the disk section adjusting means.

To contol the adjustment of the disk sections 20 and 23, the system 31 is equipped with a main valve 32. As shown in FIG. 4, such valve has a casing 33 formed with a valve chamber 34 for a slidable reception of a spool 35 with spaced grooves 36 and 37. The casing 33 is also formed with an inlet port 38, cylinder ports 39,39 and exhaust ports 40,40. Port 38 is adapted for connection with a suitable source of fluid, either liquid or gaseous, under pressure, while ports 40,40 are connected with a reservoir or the atmosphere if air is used as the fluid. Ports 39 are adapted for connection via suitable tubes 41 with passages 30 leading to chambers 28. Suitable actuating means (not shown) for the spool 35 may be provided. Valve 32 serves to alternately connect one chamber 28 with the fluid pressure source and the other chamber 28 with exhaust. The chamber connected with the fluid pressure source will receive fluid under pressure which will urge the disk section containing such chamber toward the complemental disk section and decrease the width of the Vee-groove of the respective pulley. By such action the effective diameter of the pulley will be increased and the belt will be squeezed. Since the chamber 28 of the other pulley is connected with exhaust, the disk section containing this chamber is free to move away from its complemental disk under the force of the belt being drawn deeper into the groove because of the increase in effective diameter of the first pulley. In this manner the speed ratio of the transmission is changed. The rate of change is dependent upon the rate of introduction of fluid pressure to the chamber 28 of the pulley having its effective diameter increased. The speed ratio can be varied smoothly in a stepless manner. When the desired ratio is reached, the adjustment is discontinued and the ratio maintained by disposing the spool valve in a near neutral position wherein both chambers 28 are prevented from communicating with either the pressure source or exhaust. It may be desirable to construct the valve in a manner to apply predetermined pressure on both chambers to maintain a squeezing force on the belt and prevent slippage.

As indicated in FIG. 1, one of the shaft portions, in this instance portion 14, is formed as at 41a for connection with a prime mover to impart torque to the respective pulley. Such pulley is designated in FIG. 1 by the letter 'A' and constitutes the driving pulley. The torque imparted thereto is transmitted in either amplified or decreased ratio by the belt C to the pulley B which constitutes the driven pulley. It will be apparent that by changing the effective diameters of the pulleys the speed ratio of the transmission will be changed.

FIGS. 3a and 3b schematically illustrate the transmission of the present invention and a prior art Vee-belt transmission to show an advantage of the angularly related axes of rotation of the disk sections. The prior art transmission is of the type in which the disk sections of each pulley are arranged to rotate about the same axis instead of angularly related axes. By using the latter arrangement, the slack run of the belt, i.e., the run leaving the driving pulley, will be disengaged earlier and the force of extraction of the belt will be greatly decreased. This decrease will also reduce the fluid pressure necessary to adjust and maintain the position of the movable disk sections of the pulleys. The portion of the pulley engaged by the belt in the transmission of the invention is indicated by the angle a in FIG. 3a, while the similar portion in a prior art transmission is indicated by the angle b of FIG. 3b.

It will be noted from FIG. 3b that in the prior art transmission the belt has a tendency to wrap around the pulley on the side of the slack run until it is pulled out of the pulley groove, the slack run of the belt then being disposed at an angle, designated as the "belt angle of turn," which is $90° - \phi°$ relative to a line tangent to the pulley at the point of separation of the belt therefrom. As shown in FIG. 3a, the belt in the transmission built according to the invention does not wrap around the pulley and therefore does not require as much axial load to effect the operation of the transmission.

For convenience in future discussion, the prior art transmission is designated as a "straight axis belt drive" while the transmission is designated as a "bent axis belt drive" in view of the angular relation of one shaft portion to the other of each pulley.

FIG. 5 of the drawings graphically illustrates certain characteristics of a straight axis belt drive versus a bent axis belt drive; for example, how the belt angle of turn, $90° - \phi°$ varies with the belt friction coefficient $\mu$ for different values of nr, a pulley size factor wherein $n =$ lobes/inch of belt and $r =$ belt pulley radius in inches. The required axial load ($Fax_s$) to be applied to the pulley sheave of the straight axis belt drive is compared to the similar load ($Fax_B$) as required by the bent axis belt drive. Different ratios are represented by the dashed lines in FIG. 5. This Figure shows that for a pulley size factor of 7 and a belt friction coefficient of .38, the belt angle of turn will be approximately 18°. If the belt friction coefficient is decreased, the belt angle of turn will decrease but the pulley axial load must be increased. For the straight axis belt drive, the pulley size and belt angle of turn must be increased to large values to obtain axial load requirements similar to those of the bent axis belt drive. Practical belt fatigue requirements limit the belt angle of turn to low angles in the straight axis belt drive which causes the pulley axial load ratio to be large.

Figure 6:
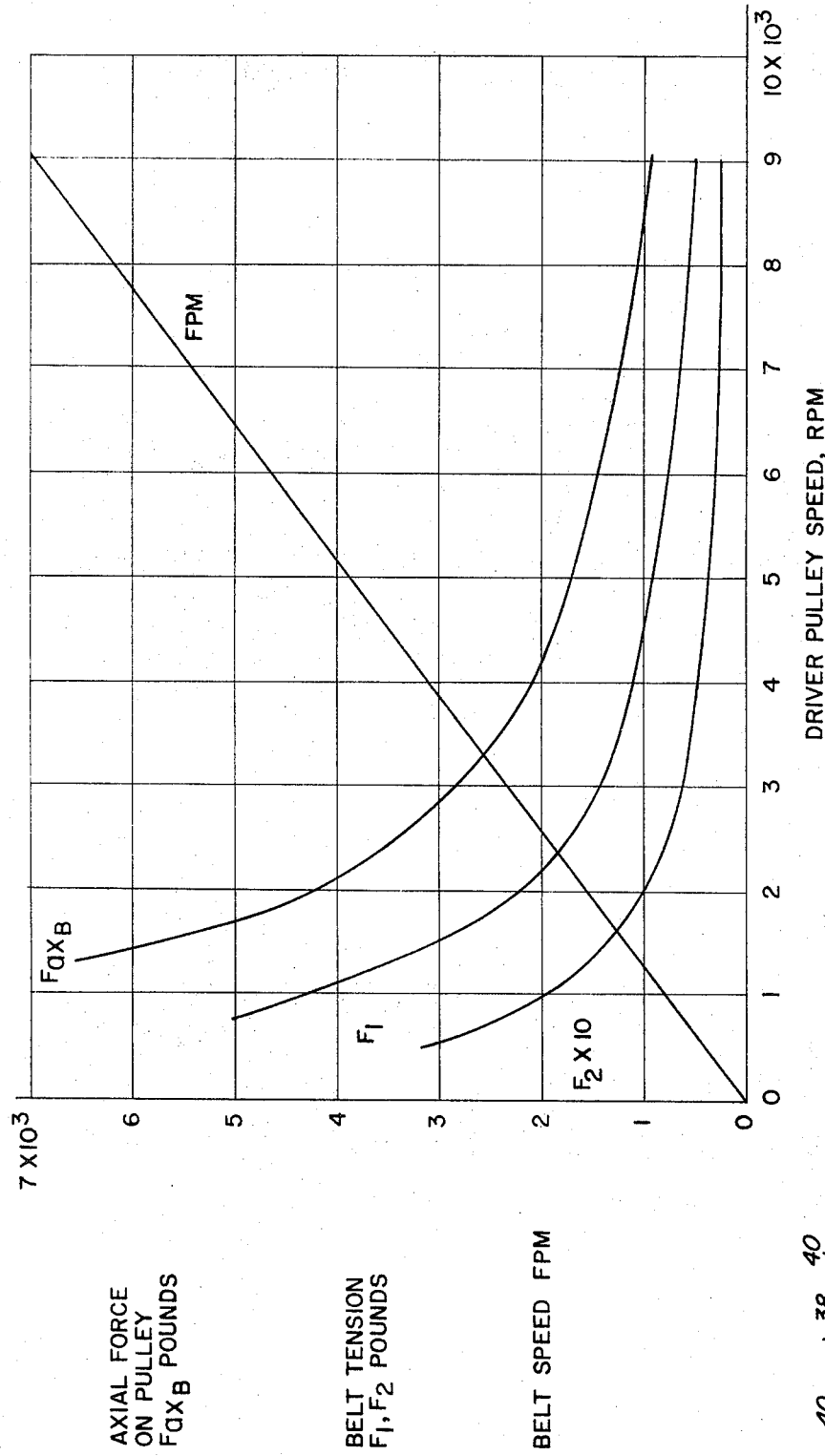
FIG. 6 is a similar illustration of the loads and speeds of the driving pulley of a particular transmission embodying the present invention.

FIG. 6 graphically illustrates the axial pulley force required to secure the necessary frictional squeeze on the belt of the bent axis pulley, and the belt tension loads to transmit 100 horsepower at various speeds as given using a pulley size factor of $nr = 3$ and a total included sheave angle, $\theta$, of 1.0 radian (57°). A bent axis total cock angle of 1.0° was also used. In FIG. 6 the belt tension in the slack run is indicated by $F_2$ while that in the other or power transmitting run is indicated by $F_1$.

Various modifications may be made in the construction and relation of parts without departing from the spirit and scope of the invention as set forth in the following claims.

I claim:
1. A variable speed belt transmission comprising:
   a. spaced driving and driven pulley elements each having a pair of opposed substantially cone-faced, rotatably supported disk sections coupled by a flexible coupling for simultaneous rotation, one disk section of each pair being axially fixed and the other disk section being axially movable, the axes of rotation of the disk sections of each pair being disposed at a predetermined angle relative to one another;
   b. means for adjusting said axially movable disk sections toward and away from said axially fixed disk sections; and
   c. an endless Vee-belt composed of a material having a predetermined compressibility extending around said pulley elements to transmit rotary movement from the driving to the driven pulley element.

2. The variable speed belt transmission of claim 1 in which the endless Vee-belt is provided on the inner side with pulley engaging lobes.

3. The variable speed belt transmission of claim 1 in which the disk sections of each pair are coupled together for simultaneous rotation.

4. The variable speed belt transmission of claim 1 in which the axially adjustable disk section of one pulley element is disposed on the opposite side of the transmission from the axially adjustable disk section of the other pulley element.

5. The variable speed belt transmission of claim 1 in which the means for adjusting said axially movable disk sections toward and away from said axially fixed disk sections is actuated by fluid pressure.

6. The variable speed belt transmission of claim 5 in which means are provided to control the application of fluid pressure to said fluid pressure actuated means to cause the axially movable disk section of one pulley element to move toward the axially fixed disk section of such element when the axially movable disk section of the other pulley element moves away from the axially fixed disk section thereof.

7. The variable speed belt transmission of claim 5 in which the axially movable disk adjusting means includes piston and cylinder units.

8. The variable speed belt transmission of claim 7 in which valve means are provided to simultaneously connect one piston and cylinder unit with a source of pressure and the other piston and cylinder unit with exhaust.

9. The variable speed belt transmission of claim 1 in which each disk section has a shaft portion supported for rotation in antifriction bearings.

10. The variable speed belt transmission of claim 9 in which the movable disk sections are splined to the respective shaft portion for rotation therewith and adjustment axially relative thereto.

11. A variable speed belt transmission comprising:
 a. transmission support means;
 b. spaced driving and driven pulley elements each having a pair of opposed substantially cone-faced rotatably supported disc sections, each of said disc sections having a shaft portion supported for rotation in antifriction bearings, one disc section of each pair being axially fixed and the other disc section being axially movable, said movable portion being splined to its respective shaft portion and adjustable axially relative thereto, said movable section further forming a cylindrical chamber at one end thereof, the axes of rotation of the disc sections of each pair being disposed at a predetermined angle relative to one another;
 c. piston means in axially fixed relation to the shaft portions and disposed in said cylindrical chambers and forming a fluid receiving chamber therebetween;
 d. means for introducing and exhausting fluid under pressure into said chamber for adjusting said axially movable disc section toward and away from said axially fixed disc section; in response to changes in pressure of said fluid; and
 e. an endless Vee-belt composed of a material having a predetermined compressibility extending around said pulley elements to transmit rotary movement from the driving to the driven pulley element.

12. The variable speed belt transmission of claim 11 in which said piston means are attached to said support means.

13. A variable speed belt transmission comprising:
 a. transmission support means;
 b. spaced driving and driven pulley elements supported in said support means, each of said pulleys having a pair of opposed substantially cone-faced rotatably supported disc sections, one of said disc sections of each pair being axially movable with respect to its axis of rotation and the other being axially fixed with respect to its axis of rotation, the axes of rotation of the disc sections of each pair being disposed at a predetermined angle other than zero relative to one another;
 c. means for adjusting said axially movable disc sections toward and away from said axially fixed disc sections; and
 d. an endless Vee-belt composed of a material having a predetermined compressibility extending around said pulley elements to transmit rotary movement from the driving to the driven pulley element.

14. A variable speed belt transmission as defined in claim 13 wherein each disc section has a shaft portion rotatably supporting said disc section on said support means, each respective pair of shaft portions being connected to each other for simultaneous rotation about their respective axes of rotation.

15. A variable speed belt transmission according to claim 14 wherein each pair of shaft portions is connected by a flexible coupling.

16. A variable speed belt transmission comprising:
 a. spaced driving and driven pulley elements each having a pair of opposed generally cone-spaced disc sections forming a groove therebetween, said disc sections being rotatably supported for simultaneous rotation, the respective axes of rotation of each disc section of each pair being disposed in a nonparallel relationship and forming a predetermined angle at their junction, one of said discs being axially movable with respect to its axis of rotation and the other being axially fixed with respect to its axis of rotation;
 b. means for axially adjusting said axially movable disc sections with respect to their respective axially fixed disc sections; and
 c. an endless Vee-belt of a material having a predetermined compressibility extending around said pulley elements to transmit rotary movement from the driving to the driven pulley element.

17. The variable speed belt transmission according to claim 16 wherein each of said disc sections has a shaft portion, said shaft being supported for rotation about the axes of rotation of its respective disc section.

18. The variable speed belt transmission according to claim 17 wherein the shaft portions of each pair of disc sections are connected at the junction of their rotational axes for simultaneous rotation.

19. The variable speed belt transmission according to claim 18 wherein each pair of shaft portions are connected by a flexible coupling.

* * * * *